(No Model.)
A. J. ADAMSON.
APPARATUS FOR ROASTING AND TREATING SORGHUM AND SUGAR CANE.
No. 428,439. Patented May 20, 1890.
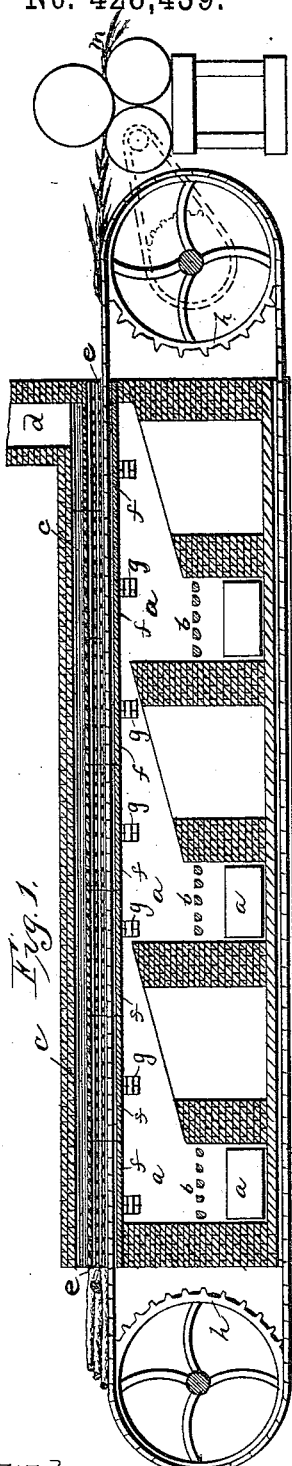
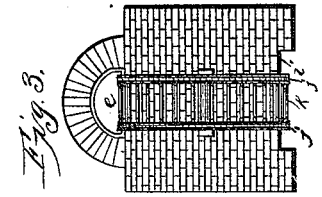
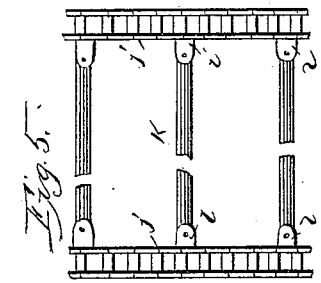
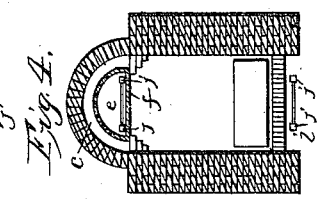
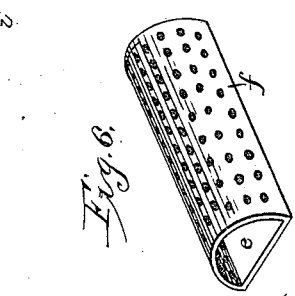
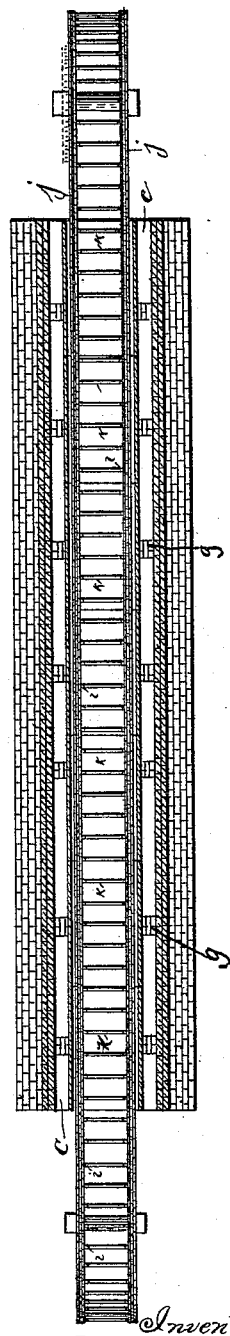
Witnesses:
E. C. Duffy
Chas. M. Werle
Inventor:
Andrew J. Adamson
per O. E. Duffy Attorney

UNITED STATES PATENT OFFICE.

ANDREW J. ADAMSON, OF SABETHA, KANSAS.

APPARATUS FOR ROASTING AND TREATING SORGHUM AND SUGAR-CANE.

SPECIFICATION forming part of Letters Patent No. 428,439, dated May 20, 1890.

Application filed June 22, 1889. Serial No. 315,275. (No model.)

*To all whom it may concern:*

Be it known that I, ANDREW J. ADAMSON, of Sabetha, in the county of Nemeha and State of Kansas, have invented certain new and useful Improvements in Apparatus for Roasting and Treating Sorghum and Sugar-Cane; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an apparatus for drying, roasting, and purifying sugar-cane.

The object of the invention is to provide an apparatus for heating and roasting sugar-cane and thereby purifying and freeing the same from all foreign substances and animal and insect life, so that the cane will be in a pure and clean condition when passed into the mill or cutter, and also to provide a simple, cheap, and effective apparatus for the above purpose, quick in its operation and requiring no skilled operators. These objects are accomplished by and my invention consists in certain novel features of construction and in combinations of parts more fully described hereinafter, and particularly pointed out in the claims.

Referring to the accompanying drawings, Figure 1 is a longitudinal vertical section of the present apparatus. Fig. 2 is a top plan of the same with the oven removed. Fig. 3 is an end view. Fig. 4 is a cross-section. Fig. 5 is a detail plan of an enlarged portion of the conveyer, and Fig. 6 is a detail perspective of a section of the oven-walls.

In the drawings, the reference-letter $a$ indicates a furnace, having a series of fire-boxes and grate-bars $b$ located beneath and opening into a single elongated horizontal heating-flue or combustion-chamber $c$, having the smoke pipe or exit $d$ at one end, so that the products of combustion, &c., from the various fire-boxes must travel through said chamber $c$ and around the roasting-chamber to the exit therefrom. The smoke and gases from the combustion-chamber and the oven pass off through the same uptake. A continuous heating passage or oven $e$ is formed longitudinally and horizontally through said heating and combustion chamber and is open at the ends, as shown, and this oven is formed by a series of D-shaped sections $f$, open at each end and placed end to end, as shown, and having imperforate bottoms and convex perforated upper walls; and this oven, or sections thereof, is supported directly above the fire-boxes and in the combustion-chamber by brackets $g$. A covering of sand-ash or the like may be put outside the furnace-arch to prevent radiation and retain the heat.

Sprocket-wheels $h\,h$ are mounted in vertical planes at each end of the furnace $a$ and are of sufficient diameter to extend from the plane of the open ends of the ovens to the open ends of a longitudinal passage $i$ beneath the furnace. These sprocket-wheels carry and operate an endless conveyer extending and traveling through the lower portion of the oven around the sprocket-wheels and through the passage $i$ beneath the furnace. The conveyer is composed of a pair of parallel sprocket-chains $j\,j$, connected at intervals by a series of cross-bars $k$, riveted to ears $l$, secured to or formed with the links of each chain. Wire rope or chain conveyer may be substituted for the sprocket-chain if found desirable.

In operation motion is imparted to the pair of sprocket-wheels at one end of the furnace to impart motion to the conveyer, so that it will travel through the oven from that end. A gear-connection is made at the other end of the conveyer on the sprocket-wheel, so that the mill may be run by the same power that works the conveyer. The sugar-cane or sorghum is longitudinally laid on the conveyer at one end of the oven, so as to rest on the cross-bars thereof, and is slowly carried throughout the length of the oven, where it is purified. The heat from the fire-boxes, transmitted through and passing up around and over the oven, will quickly kill and destroy any animal or insect life that may be on the cane and will also destroy all foreign vegetable matter, dust, leaves, &c. By this process the joints of the cane, which usually contain a quantity of dirt and insects, are roasted out, and the cane is delivered into the crushing-rollers or cutters $m$ of the sugar-mill in a cleansed and purified condition.

This device can be used for sorghum or other purposes. The perforations in the top wall of the oven allow the smoke, &c., from the cane passing through the oven to escape into the combustion-chamber of the furnace, and these perforations also allow the heat in the combustion-chamber to have full effect on the cane.

Of course it is evident that some other source of heat might be employed for the oven, and that changes might be resorted to in the form and arrangement of the parts described without departing from the spirit and scope of my invention; hence I do not wish to limit myself to the precise construction herein shown and set forth.

Having thus fully described my invention, what I claim as new, and desire to secure by Letters Patent of the United States, is—

1. In an apparatus for roasting sugar-cane, the combination, with a furnace having an elongated combustion-chamber and an inclosed horizontal oven extending through said chamber and having a perforated top wall, of an endless traveling conveyer extending through said oven and adapted to convey sugar-cane through the oven and deliver the same to a sugar-mill, for the purpose set forth.

2. In an apparatus for the purpose set forth, the combination of a furnace having a horizontal combustion-chamber in the upper portion and fire-chambers beneath and opening into the same, an inclosed horizontal oven extending through the combustion-chamber and having an imperforate bottom above said fire-chambers and a perforated top, and traveling conveyer extending through said oven, for the purpose set forth.

3. In an apparatus for the purpose set forth, the combination of the horizontal combustion-chamber having means for heating the same, an inclosed oven extending through said chamber and consisting of a series of sections placed end to end and supported by brackets, each section being D-shaped in cross-section and having an imperforate bottom and perforated top, and the traveling conveyer extending through the oven, substantially as described.

In testimony that I claim the foregoing as my own I affix my signature in presence of two witnesses.

ANDREW J. ADAMSON.

Witnesses:
 O. E. DUFFY,
 C. M. WERLE.